(12) United States Patent
Kang et al.

(10) Patent No.: US 10,384,400 B2
(45) Date of Patent: Aug. 20, 2019

(54) THERMOPLASTIC RESIN COMPOSITE AND PREPARATION METHOD OF THERMOPLASTIC RESIN COMPOSITE

(71) Applicants: HYUNDAI MOTOR COMPANY, Seoul (KR); KIA MOTORS CORPORATION, Seoul (KR)

(72) Inventors: Hyun Min Kang, Seongnam-si (KR); Deok Woo Yun, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 216 days.

(21) Appl. No.: 15/134,143

(22) Filed: Apr. 20, 2016

(65) Prior Publication Data
US 2017/0173861 A1    Jun. 22, 2017

(30) Foreign Application Priority Data
Dec. 16, 2015    (KR) ...................... 10-2015-0180509

(51) Int. Cl.
| | | |
|---|---|---|
| *B29L 9/00* | (2006.01) | |
| *B32B 7/04* | (2019.01) | |
| *B32B 7/08* | (2019.01) | |
| *D03D 1/00* | (2006.01) | |
| *B29C 65/02* | (2006.01) | |
| *B29C 65/62* | (2006.01) | |
| *B29C 70/00* | (2006.01) | |
| *B29K 23/00* | (2006.01) | |
| *B29K 25/00* | (2006.01) | |
| *B29K 31/00* | (2006.01) | |
| *B32B 27/08* | (2006.01) | |
| *B32B 27/28* | (2006.01) | |
| *B32B 27/30* | (2006.01) | |
| *B32B 27/32* | (2006.01) | |
| *B32B 37/00* | (2006.01) | |
| *B32B 37/06* | (2006.01) | |
| *B32B 37/10* | (2006.01) | |
| *B32B 38/00* | (2006.01) | |
| *B32B 38/08* | (2006.01) | |
| *D03D 13/00* | (2006.01) | |

(52) U.S. Cl.
CPC .............. *B29C 65/62* (2013.01); *B29C 65/02* (2013.01); *B29C 70/00* (2013.01); *B32B 7/04* (2013.01); *B32B 7/08* (2013.01); *B32B 27/08* (2013.01); *B32B 27/28* (2013.01); *B32B 27/306* (2013.01); *B32B 27/308* (2013.01); *B32B 27/32* (2013.01); *B32B 38/08* (2013.01); *D03D 1/00* (2013.01); *D03D 13/002* (2013.01); *B29K 2023/00* (2013.01); *B29K 2023/10* (2013.01); *B29K 2025/04* (2013.01); *B29K 2031/04* (2013.01); *B29L 2009/00* (2013.01); *B32B 37/0046* (2013.01); *B32B 37/06* (2013.01); *B32B 37/1027* (2013.01); *B32B 2038/008* (2013.01); *B32B 2250/24* (2013.01); *B32B 2250/242* (2013.01); *B32B 2262/0253* (2013.01); *B32B 2307/51* (2013.01); *B32B 2307/54* (2013.01); *B32B 2309/02* (2013.01); *D10B 2505/02* (2013.01)

(58) Field of Classification Search
CPC ............ B29C 65/62; B32B 7/08; B32B 27/08
See application file for complete search history.

(56) References Cited

U.S. PATENT DOCUMENTS

| | | | | |
|---|---|---|---|---|
| 4,913,937 | A * | 4/1990 | Engdahl | B29C 70/24 427/314 |
| 5,429,853 | A * | 7/1995 | Darrieux | B29C 70/24 112/440 |
| 5,569,344 | A * | 10/1996 | Grimnes | B29C 70/08 156/90 |
| 5,591,933 | A * | 1/1997 | Li | F41H 5/0485 156/93 |
| 6,399,194 | B1 * | 6/2002 | Kunisada | D02G 1/02 428/357 |
| 6,458,727 | B1 | 10/2002 | Jones et al. | |
| 7,976,932 | B1 * | 7/2011 | Lyons | B32B 5/12 139/383 R |
| 2005/0164578 | A1 * | 7/2005 | LoFaro | C08J 5/046 442/181 |
| 2007/0071941 | A1 * | 3/2007 | Eleazer | B29C 70/24 428/92 |
| 2007/0071942 | A1 * | 3/2007 | Callaway | B29C 70/24 428/95 |
| 2010/0215887 | A1 * | 8/2010 | Kawabe | B29C 43/146 428/56 |
| 2012/0065283 | A1 | 3/2012 | Adjei et al. | |
| 2012/0186720 | A1 * | 7/2012 | Cartabbia | A41D 27/245 156/73.4 |
| 2013/0153130 | A1 * | 6/2013 | Kitagawa | B29C 70/504 156/222 |
| 2013/0189888 | A1 * | 7/2013 | Patrick | B29C 73/22 442/71 |

(Continued)

FOREIGN PATENT DOCUMENTS

| | | |
|---|---|---|
| CN | 101466535 A | 6/2009 |
| CN | 104781069 A | 7/2015 |

(Continued)

OTHER PUBLICATIONS

Machine translation of JP-2002227066-A (Year: 2018).*

(Continued)

*Primary Examiner* — Liam J Heincer
(74) *Attorney, Agent, or Firm* — Morgan Lewis & Bockius LLP

(57) ABSTRACT

A method of preparing a thermoplastic resin composite includes laminating a matrix resin layer and a reinforcing resin layer to prepare a resin laminate, and heat-bonding the resin laminate, and prior to the step of heat-bonding the resin laminate, fixing one or more selected from the group consisting of the reinforcing resin layer and the resin laminate using a stitch resin having a draw ratio of less than 10:1 and a melting point of 150° C. or lower.

9 Claims, 4 Drawing Sheets

(56) References Cited

U.S. PATENT DOCUMENTS

| | | | | |
|---|---|---|---|---|
| 2013/0260087 A1* | 10/2013 | Woods, II | ............. | D06M 17/10 428/102 |
| 2014/0134391 A1* | 5/2014 | Lumb | ................ | B32B 7/08 428/102 |
| 2014/0182447 A1* | 7/2014 | Kang | ................ | F16F 1/00 87/9 |
| 2014/0335752 A1* | 11/2014 | Ettin | ................ | D02G 3/045 442/199 |
| 2015/0266268 A1* | 9/2015 | Coxon | ................ | B29C 65/40 428/198 |
| 2016/0279884 A1* | 9/2016 | Cantwell | ................ | B29C 70/543 |
| 2016/0279897 A1 | 9/2016 | Yamazaki et al. | | |
| 2016/0375642 A1* | 12/2016 | Yun | ................ | B29C 70/04 264/171.13 |
| 2017/0080678 A1* | 3/2017 | Bhatnagar | ................ | B32B 5/022 |
| 2017/0203538 A1* | 7/2017 | Lumb | ................ | B32B 5/06 |
| 2017/0274621 A1* | 9/2017 | Coxon | ................ | B29C 66/45 |
| 2017/0334153 A1* | 11/2017 | Wilson | ................ | B29C 70/545 |

FOREIGN PATENT DOCUMENTS

| | | |
|---|---|---|
| EP | 2899018 A1 | 7/2015 |
| JP | 2002227066 A * | 8/2002 |
| JP | 2005-120547 A | 5/2005 |
| JP | 2006-291369 A | 10/2006 |
| JP | 2007-160587 A | 6/2007 |
| JP | 2010-196177 A | 9/2010 |
| KR | 10-2005-0081052 A | 8/2005 |
| KR | 10-2015-0073884 A | 7/2015 |

OTHER PUBLICATIONS

Total PPH 3462 Polypropylene, Extrusion Grade (http://www.matweb.com/search/datasheet_print.aspx?matguid=fbbf2e8103ad461ba7e4b2082cf68644). (Year: 2018).*

* cited by examiner

[FIG. 1]
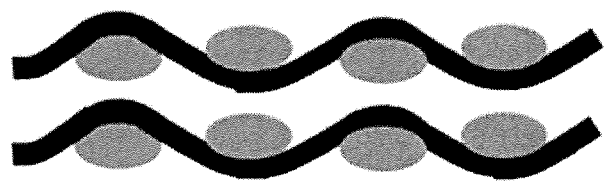
— reinforcing fiber/tape
● matrix resin
[FIG. 2]
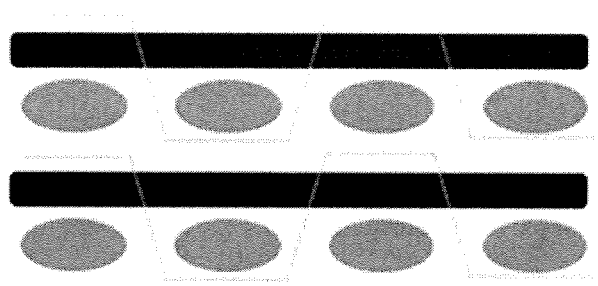
— reinforcing fiber/tape
● matrix resin
--- stitch fiber

[FIG. 3]
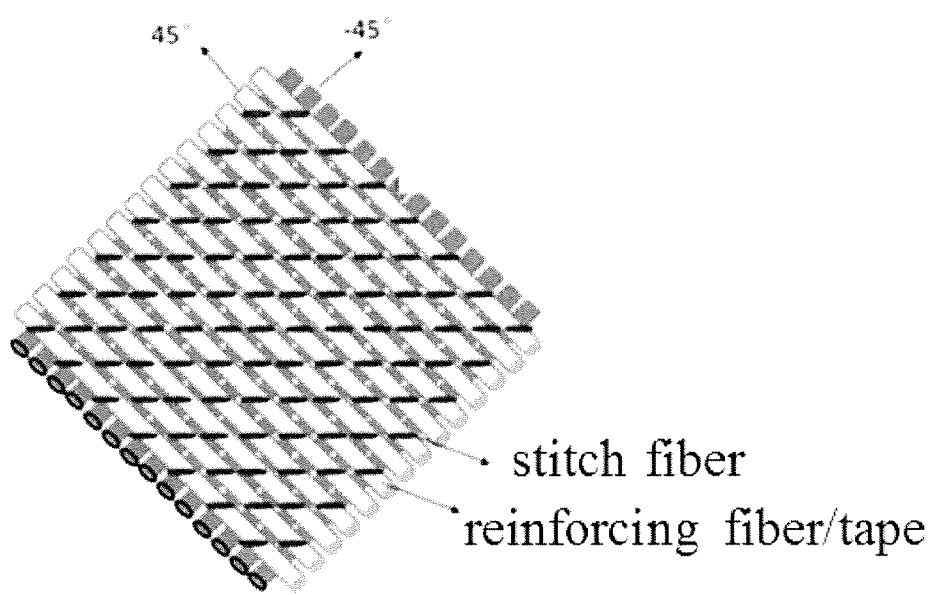

[FIG. 4]
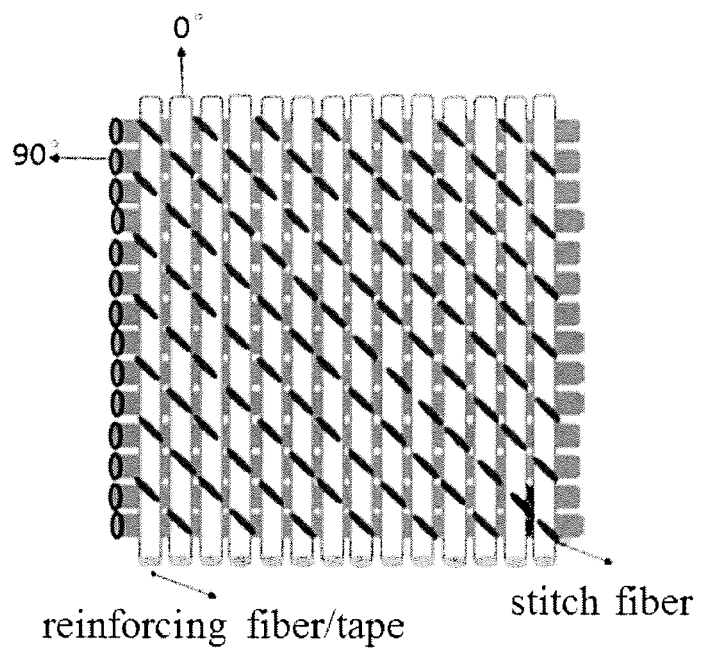

[FIG. 5]
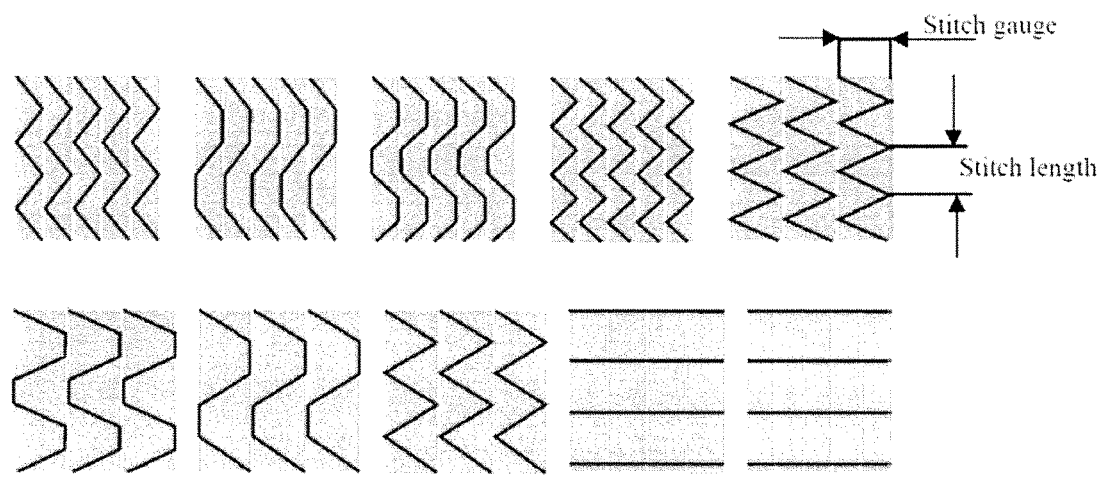

THERMOPLASTIC RESIN COMPOSITE AND PREPARATION METHOD OF THERMOPLASTIC RESIN COMPOSITE

CROSS-REFERENCE TO RELATED APPLICATION

This application claims the benefit of priority to Korean Patent Application No. 10-2015-0180509, filed on Dec. 16, 2015 with the Korean Intellectual Property Office, the disclosure of which is incorporated herein in its entirety by reference.

TECHNICAL FIELD

The present disclosure relates to a thermoplastic resin composite with improved tensile property and a preparation method of the thermoplastic resin composite. More particularly, the present disclosure relates to a self-reinforced thermoplastic resin composite with improved tensile property.

BACKGROUND

Fiber reinforced plastic (FRP) is a composite material used in civil and architectural engineering fields, transportation fields such as vehicle materials, electronic/electrical fields, aerospace fields, among others. In such an FRP, a thermosetting resin, such as an unsaturated polyester resin, a vinyl-ester resin, an epoxy resin, a phenolic resin, or a thermoplastic resin such as polyethylene, polypropylene, ABS resin, polycarbonate, polyacetal, polyamide, polystyrene, polyphenylene sulfide, etc. is used as a matrix resin. An inorganic fiber such as a glass fiber, a metal fiber, a ceramic fiber, a carbon fiber, etc., or an organic fiber such as a natural fiber, a polypropylene fiber, a polyamide fiber, a polyester fiber, a polyacrylate fiber, a polyimide fiber, etc. is used in various forms as a reinforcing fiber. Among the reinforcing materials, glass fibers have been widely used in consideration of strength of a resulting FRP. For example, when an inorganic fiber such as glass fiber or an organic fiber different from a material of the resin matrix is used as the reinforcing material of FRP, there is a disadvantage in that recycling is difficult.

Accordingly, FRP with high recyclability, which is composed of the resin matrix and the reinforcement being made of identical materials, has been developed. With respect to such self-reinforced composite, FRP using an organic fiber, in particular, a resin fiber rather than an inorganic fiber as the reinforcing material has been used. This FRP has slightly lower strength than those composed of inorganic fibers. However, there are many advantages because the reinforcing fiber and the matrix resin have similar physical properties. The self-reinforced composite is a low specific gravity, high-strength material having a very low specific gravity of 0.9 or less, but it may exhibit tensile modulus of elasticity and strength being similar to those of the existing glass fiber (discontinuous)-reinforced composite. Therefore, when the self-reinforced composite is used as an alternative to the existing short/long GFRP, there are advantages that additional weight reduction of about 30% is possible and the self-reinforced composite may exhibit excellent recyclability owing to use of the single thermoplastic material, compared to the existing fiber-reinforced composite.

FRP composed of the matrix resin and the reinforcing material being made of the identical materials may be prepared by a method of blending or laminating the matrix resin and the reinforcing material, in which the reinforcing material is composed of a thermoplastic fiber or film with high strength and high modulus of elasticity, or the matrix resin is composed of the material identical to the thermoplastic resin used in the reinforcing material and a solvent, and then heating and pressing them to form a composite. However, this method generates a problem of environmental pollution due to use of a solvent. Accordingly, there is a need to provide a high-strength FRP with excellent recyclability and an improved preparation method thereof.

There have been many attempts to improve a reinforcing effect and tensile property of FRP, which is composed of the matrix resin and the reinforcing material made of the identical material and shows a lower reinforcement effect than those composed of inorganic reinforcing material.

For example, U.S. Pat. No. 6,458,727 discloses a method of preparing a self-reinforced composite, in which a highly drawn polypropylene tape is prepared and then only the surface thereof is selectively melted. However, physical properties may be deteriorated due to generation of waviness during tape weaving, and a processing window becomes narrow because only the surface of the highly drawn polypropylene should be selectively melted, leading to a reduction in productivity.

Another example is a self-reinforced tape which is prepared from homopolypropylene (core) and random-polypropylene (shell) by co-extrusion as in the manufacture of Pure (trade name) by Lankhorst. In this product, the used materials are the same polypropylene, but the random polymer having a melting point lower than that of the resin used in the core is applied to the surface, thereby widening the processing window and increasing productivity. However, an additional process of weaving this self-reinforced composite tape is needed, and a deterioration of the physical properties due to generation of waviness during tape weaving still remains problematic.

Accordingly, there is a demand for a self-reinforced composite with excellent physical properties, such as tensile strength, which is prepared by a simple process with high productivity, and a preparation method thereof, in which deterioration of the physical properties due to generation of waviness during tape weaving is reduced, heat-bonding processes are simple, and high productivity is achieved, resulting in reduced deterioration of the physical properties.

SUMMARY

An object of the present disclosure is to provide a self-reinforced thermoplastic resin composite with improved tensile property, which is prepared by fixing a resin layer using a thermoplastic resin having a particular melting point and draw ratio, and a preparation method thereof.

Another object of the present disclosure is to provide a method of preparing a resin composite, in which the resin composite is prepared by fixing a resin laminate or a reinforcing resin, which are consisting of a reinforcing resin and a matrix resin, using the thermoplastic resin having a particular melting point and draw ratio, and optionally, by heat-bonding the fixation thermoplastic resin.

Still another object of the present disclosure is to provide a method of preparing the thermoplastic resin composite, the method showing high productivity, having a simple process, and capable of preventing deterioration of physical properties according to weaving processes or heat-bonding processes.

BRIEF DESCRIPTION OF THE DRAWINGS

FIG. 1 shows a resin laminate woven by the conventional method of interlacing warp and weft;

FIG. 2 shows a resin laminate according to an exemplary embodiment of the present disclosure, in which warp and weft are arranged linearly without interlacing, and where a stitch resin fiber is used to stitch the warp and weft;

FIG. 3 shows a fabric prepared by weaving a reinforcing fiber, in which stitching was performed at an angle of ±45 degrees when warp and weft of the reinforcing fiber were woven according to an exemplary embodiment of the present disclosure;

FIG. 4 shows a fabric prepared by weaving a reinforcing fiber, in which stitching was performed at an angle of 0/90 degrees when warp and weft of the reinforcing fiber were woven according to an exemplary embodiment of the present disclosure; and FIG. 5 shows fabrics prepared by weaving reinforcing fibers, in which the reinforcing fibers are fixed by various stitch patterns according to exemplary embodiments of the present disclosure.

DETAILED DESCRIPTION

As described above, the present disclosure relates to a self-reinforced thermoplastic resin composite with improved tensile properties, and a preparation method of the self-reinforced thermoplastic resin composite.

An aspect of the present disclosure provides a method of preparing a thermoplastic resin composite, the method including the steps of laminating a matrix resin layer and a reinforcing resin layer to prepare a resin laminate, heating and bonding the resin laminate, and further including the step of fixing one or more selected from the group consisting of the reinforcing resin layer and the resin laminate using a stitch resin having a melting point and a draw ratio lower than those of the reinforcing resin, prior to the step of bonding the resin laminate.

In detail, prior to the step of bonding the resin laminate, the step of fixing one or more selected from the group consisting of the reinforcing resin layer and the resin laminate using the stitch resin having a draw ratio of less than 10:1 and a melting point of 150° C. or lower may be performed.

In more detail, the method of preparing the thermoplastic resin composite may include the steps of laminating the matrix resin layer, including a matrix resin having a melting point of 100° C. to 150° C., and the reinforcing resin layer, including a reinforcing resin having a draw ratio of 11:1 to 20:1 and a melting point of 160° C. to 180° C., to prepare the resin laminate; and heating and bonding the resin laminate. The method may further include the step of fixing one or more selected from the group consisting of the reinforcing resin layer and the resin laminate using the stitch resin having a draw ratio of less than 10:1 and a melting point of 150° C. or lower, prior to the step of bonding the resin laminate.

Another aspect of the present disclosure provides the thermoplastic resin composite including the resin laminate prepared by laminating the matrix resin layer and the reinforcing resin layer, and the stitch resin fixing one or more selected from the group consisting of the reinforcing resin layer and the resin laminate and having a melting point and a draw ratio lower than those of the reinforcing resin.

The stitch resin may have a melting point and a draw ratio lower than those of the reinforcing resin, for example, a draw ratio of less than 10:1 and a melting point of 150° C. or lower.

In detail, the matrix resin layer may include a matrix resin having a melting point of 100° C. to 150° C., and the reinforcing resin layer may include a reinforcing resin having a draw ratio of 11:1 to 20:1 and a melting point of 160° C. to 180° C.

In more detail, the present disclosure relates to a thermoplastic resin composite, including a resin laminate including the matrix resin having a melting point of 100° C. to 150° C. and a reinforcing resin having a draw ratio of 11:1 to 20:1 and a melting point of 160° C. to 180° C., and a stitch resin having a draw ratio of less than 10:1 and a melting point of 150° C. or lower, in which the stitch resin is melted and impregnated into the resin laminate.

In the thermoplastic resin composite, the stitch resin and the matrix resin are melted and bonded. The composite may have a tensile stiffness of 2.4 GPa and greater and a tensile strength of 170 Mpa or greater.

According to the thermoplastic resin composite of the present disclosure and the preparation method thereof, the effect of the highly drawn homopolymer reinforcing resin may be maximized to improve productivity and tensile properties of the self-reinforced composite, a reduction in degree of crystallization of the highly drawn homopolymer reinforcing resin by heat may be prevented by latent heat due to selective melting of the stitch resin, physical properties of the highly drawn homopolymer reinforcing resin may be maximized by reduced use of the stitch resin having a low melting point, and the deterioration of uni-directional physical properties due to generation of waviness during tape weaving may be prevented.

Hereinafter, aspects of the present disclosure will be described in more detail.

The method of preparing the thermoplastic resin composite according to the present disclosure may include the steps of laminating the matrix resin layer and the reinforcing resin layer to prepare the resin laminate, heating and bonding the resin laminate, and fixing one or more selected from the group consisting of the reinforcing resin layer and the resin laminate using the stitch resin having a melting point and a draw ratio lower than those of the reinforcing resin, prior to the step of bonding the resin laminate.

Each step of the preparation method will be described in more detail.

1. Step of Laminating Matrix Resin Layer and Reinforcing Resin Layer to Prepare Resin Laminate The step of laminating the matrix resin layer and the reinforcing resin layer to prepare the resin laminate may be performed by a method generally used in a preparation process of the thermoplastic resin composite. In the preparation of the resin laminate, the matrix resin layer and the reinforcing resin layer may be laminated by arranging them at a predetermined crossing angle.

The method of preparing the resin composite according to the present disclosure may include the step of impregnating the matrix resin into the reinforcing fiber by melting, and may further include the step of recrystallizing the melted and impregnated resin composite. Further, the method may include the step of laminating the matrix resin and the reinforcing resin prior to the melting and impregnating step.

In the melting and impregnating step, the laminated composite raw materials may be injected into a double belt laminator, and the matrix may be melted and impregnated into the reinforcement by a temperature and a pressure due to a distance between belts. A double belt press laminator having at least two sections which are different in temperature conditions may be used, and the section may be divided into 2, 3, 4 or 5 sections. In an embodiment of the present disclosure, if the laminator has 4 sections, individual sections may be separately operated by separately operated rollers, and may be set under different temperature conditions. For example, the double belt press laminator may include four or more sections under different temperature conditions, in which the sections may be divided into a first section, a second section, a third section, and a fourth section from an inlet toward an outlet of the laminator, and temperature of the first section may be in the range from room temperature to (Tm-50)° C. when the melting temperature of the reinforcing resin is indicated as Tm, temperature of the second section may be in the range from (Tm-50)° C. to (Tm-70)° C. when the melting temperature of the reinforcing resin is indicated as Tm, temperature of the third section may be in the range from (Tm-70)° C. to (Tm-90)° C., and temperature of the fourth section may be in the range from (Tm-90)° C. to (Tm-110)° C.

In the thermoplastic resin composite, more specifically, self-reinforced composite, the matrix resin and the reinforcement which are components of FRP may be made of resin materials, and preferably, the identical resin materials.

In an embodiment of the present disclosure, the matrix resin may be in the form of a film, and the reinforcing resin may be in the form of a fiber, tape or fabric. The reinforcing resin may be in the form of a unidirectional fiber, and may be arranged at a predetermined crossing angle to prepare the reinforcing resin layer.

As the matrix resin and the reinforcing resin of the present disclosure, any known thermoplastic resin may be used, and there is no particular limitation thereof. Preferably, the reinforcing resin has a melting point higher than that of the matrix resin. The matrix resin layer may include a matrix resin having a melting point of 100° C. to 150° C., and the reinforcing resin layer may include a reinforcing resin having a melting point of 160° C. to 180° C.

In the present disclosure, the reinforcing resin may have a high draw ratio, for example, a draw ratio of 11:1 to 20:1. Therefore, the reinforcing resin layer may include the reinforcing resin having a draw ratio of 11:1 to 20:1 and a melting point of 160° C. to 180° C.

Examples of the matrix resin and the reinforcing resin to be used in the present disclosure may include a thermosetting resin, such as an unsaturated polyester resin, a vinylester resin, an epoxy resin, a phenolic resin, or a thermoplastic resin such as polyethylene, polypropylene, ABS resin, polycarbonate, polyacetal, polyamide, polystyrene, polyphenylene sulfide, among others. Examples of the reinforcing resin may include one or more selected from the group consisting of polypropylene, polybutylene, polypentene, poly(vinyl acetate) and polystyrene.

The matrix resin and reinforcing resin may be a polyolefin resin, for example, a homopolymer, heteropolymer or copolymer containing an acyclic olefin having 2-4 carbon atoms as a repeating unit. Examples of the polyolefin resin may include polyethylene, polypropylene and/or a copolymer of polyethylene and polypropylene.

The reinforcing resin may be a resin having physical properties identical or similar to those of the matrix resin.

As used herein, the term "self-reinforced" reinforcement broadly refers to a reinforcement made of a resin material, and is distinguished from the conventional reinforced composite composed of a matrix made of a resin and a reinforcement made of an inorganic fiber such as a carbon fiber or a glass fiber, and narrowly to a reinforcement made of a resin having physical properties being similar or identical to those of the matrix resin. For example, the self-reinforced reinforcement may be determined by Differential Scanning calorimetry (DSC). That is, when a composite prepared by using the matrix resin and the reinforcing resin is analyzed by DSC, a single identical Tm peak, rather than two different peaks, may be observed at a first heating peak.

2. Step of Fixing Using Stitch Resin

The stitch resin may be used to fix one or more selected from the group consisting of the reinforcing resin layer and the resin laminate. The resin laminate may be a laminate of the reinforcing resin, and preferably, a laminate of the matrix resin layer and the reinforcing resin layer. The stitch resin may function to fix the reinforcing resin layer or the resin laminate by stitching alternately over and under the reinforcing resin layer or the resin laminate, and the stitch resin may be in the form of a fiber made of a thermoplastic resin. The stitch resin may be a thermoplastic resin having a draw ratio of less than 10:1 and a melting point of 150° C. or lower, and the stitched reinforcing fiber or resin laminate may be heated to impregnate the stitch resin and the matrix resin into the reinforcing fiber, thereby fixing them to the reinforcing fiber.

For example, when the stitch resin is used to fix only the reinforcing resin layer, the reinforcing resin layer may be prepared by arranging the reinforcing resins having a form of a unidirectional fiber at a predetermined crossing angle, and the stitch fiber may be used to stitch alternately over and under the reinforcing resin layer, thereby fixing the reinforcing resin layer. For example, the reinforcing resin may be prepared in the form of a unidirectional fiber, and one layer at an angle of 0 and another layer at an angle of 90 may be layered and fixed by stitching. Examples of reinforcing resin fabrics prepared by weaving the reinforcing resins as warp and weft and fixing them by the stitch resin are shown in FIGS. 3 to 5.

For example, when the stitch resin is used to fix the resin laminate consisting of the reinforcing resin layer and the matrix resin layer, the matrix resin layer and the reinforcing resin layer may be laminated by arranging them at a predetermined crossing angle, thereby preparing the resin laminate, and the stitch fiber may be used to stitch alternately over and under the resin laminate, thereby fixing the resin laminate. An example of the resin laminate consisting of the reinforcing resin layer and the matrix resin layer, which was fixed by the stitch resin, is shown in FIG. 2.

In the present disclosure, the stitch resin may function to fix the resin laminate of the matrix resin layer and the reinforcing resin layer, and one or more selected from the group consisting of the reinforcing resin layer and the resin laminate. Further, since the stitch resin used in the fixing may have a melting point and a draw ratio lower than those of the reinforcing resin, the stitch resin may be melted by heating, and thus impregnated into the resin laminate, thereby fixing the resin laminate.

Accordingly, in the heating and bonding step, the stitch resin may be melted without melting the reinforcing resin. To accomplish this condition, the stitch resin may have a melting point and a draw ratio lower than those of the reinforcing resin, for example, a draw ratio of less than 10:1 and a melting point of 150° C. or lower. When the low melting point/undrawn fiber is used, only the low melting point/undrawn fiber is selectively melted by heating, and therefore, a reduction in crystallinity of highly drawn Homo-PP may be prevented due to a latent heat effect of phase change, and the highly drawn homo-PP fiber may also exhibit a reinforcing effect upon compression molding, owing to the fixing function of the low melting point/undrawn fiber.

The stitch resin may be in the form of a fiber having a diameter of 1 mm or less, for example, in the range of 0.05 to 1 mm. If the stitch has a thickness greater than a predetermined thickness, a ratio of the highly drawn fiber in the entire material may become low and deteriorate physical properties.

In the step of fixing, the stitch resin may pass alternately over and under the laminate to fix the laminate. As shown in FIG. 1, the conventional method is a weaving process of interlacing warp and weft, and there is a problem that unidirectional mechanical properties may deteriorate due to interlacing. However, as shown in FIG. 2, warp and weft may be arranged linearly without interlacing, and the stitch resin having a low draw ratio and a low melting point (a draw ratio of less than 10:1 and a melting point of 150° C. or lower) may be used to stitch the warp and weft, thereby solving the problem of interlacing. As shown in FIG. 5, the stitch may be modified in many different forms depending on the purpose.

3. Step of Heating and Bonding Resin Laminate

The thermoplastic resin composite of the present disclosure may include a stitch resin having a draw ratio of less than 10:1 and a melting point of 150° C. or lower, in which the stitch resin is melted and impregnated into the resin laminate to bond the resin laminate. In the step of bonding the resin laminate, heating may be performed at a temperature higher than the melting point of the stitch resin. In the step of bonding the resin laminate, heating may be performed at a temperature of 100° C. to 150° C. In the step of bonding the resin laminate, the stitch resin and the matrix resin may be selectively melted by heating.

A reduction in a degree of crystallization of the highly drawn homopolymer reinforcing resin by heat may be prevented by latent heat due to selective melting of the stitch resin, and the deterioration of uni-directional physical properties due to generation of waviness during tape weaving may be prevented.

The method of preparing the resin composite according to the present disclosure may include the step of impregnating the reinforcing fiber into the matrix resin by melting, and preferably, further include the step of recrystallizing the melted and impregnated resin composite. Further, the method may include the step of laminating the matrix resin and the reinforcing resin, prior to the melting and impregnating step.

In the melting and impregnating step, the laminated composite raw materials may be injected into a double belt laminator, and the matrix may be melted and impregnated into the reinforcement by a temperature and a pressure due to a distance between belts.

The thermoplastic resin composite may have a tensile stiffness of 2.4 GPa or greater and a tensile strength of 170 Mpa or greater, for example, a tensile stiffness of 2.4 to 2.7 GPa and a tensile strength of 170 to 190 MPa.

Still another aspect provides the thermoplastic resin composite including the resin laminate prepared by laminating the matrix resin layer and the reinforcing resin layer, and the stitch resin fixing one or more selected from the group consisting of the reinforcing resin layer and the resin laminate and having a melting point and a draw ratio lower than those of the reinforcing resin.

The stitch resin may have a melting point and a draw ratio lower than those of the reinforcing resin, for example, a draw ratio of less than 10:1 and a melting point of 150° C. or lower.

In detail, the matrix resin layer may include a matrix resin having a melting point of 100° C. to 150° C., and the reinforcing resin layer may include a reinforcing resin having a draw ratio of 11:1 to 20:1 and a melting point of 160° C. to 180° C.

In more detail, the present disclosure relates to the thermoplastic resin composite, including the resin laminate including the matrix resin having a melting point of 100° C. to 150° C. and the reinforcing resin having a draw ratio of 11:1 to 20:1 and a melting point of 160° C. to 180° C., and the stitch resin having a draw ratio of less than 10:1 and a melting point of 150° C. or lower, in which the stitch resin is melted and impregnated into the resin laminate.

In the thermoplastic resin composite, the stitch resin and the matrix resin may be melted and bonded. The composite may have a tensile stiffness of 2.4 GPa or greater and a tensile strength of 170 Mpa or greater.

The thermoplastic resin composite according to the present disclosure may be applied to many different products which have been prepared by using the known thermoplastic resin composite, for example, to self-reinforced composite.

According to a thermoplastic resin composite according to the present disclosure and a preparation method thereof, provided is a self-reinforced thermoplastic resin composite with improved tensile property, which may be prepared by fixing a resin laminate consisting of a reinforcing resin and a matrix resin or a reinforcing resin using a thermoplastic resin having a particular melting point and draw ratio. The self-reinforced composite may be applied to many different products and industries.

The present disclosure will be described in more detail with reference to the following Examples. However, the scope of the present disclosure is not intended to be limited by the following Examples.

Comparative Example 1: Preparation of Resin Composite

To prepare a resin composite, a reinforcing resin fiber and a matrix resin were prepared. As a matrix resin, a propylene/ethylene copolymer resin having MI of 25 and Tm of 130° C. was used to prepare a film by an owned process.

As the reinforcing resin, Y 120 resin from Lotte Chemical Corp., which is a homopolypropylene having MI of 1, Tm of 165° C., and a molecular weight (Mw) of 480,000, was used. The reinforcing resin was prepared as a yarn by applying a draw ratio of 15:1 using an owned process, and then a fiber was prepared. The fiber had mechanical properties of a denier of 1880, a tensile modulus of elasticity of 133.2 g/denier, a tensile strength of 6.8 g/denier, and elongation of 7.44%. 1:1 plain weaving was performed using the reinforcing fiber as weft/warp to prepare a reinforcement fabric.

To laminate the reinforcing resin and the matrix resin as a three-layered laminate in this order of reinforcing fiber/matrix/reinforcing fiber, they were placed in a roll-type unwinder. The reinforcing resin and the matrix resin were laminated in the order while they were transported from the unwinder and then transferred to a double belt press laminator. A thickness of a specimen before processing was 0.56 mm, and the double belt laminator was operated at a belt distance (roll gap) of 0.5 mm, a belt speed of 8 mm/sec and a retention time of 150 sec. The double belt press laminator was a double belt press having four separated sections. In this experiment, Sections 1 to 4 were set at different temperatures and the temperature of Section 1 was the highest. The laminator was set to have a decreasing temperature gradient from the inlet toward the outlet, and the retention times in the individual sections were set to be the same. The laminator was operated at a temperature of 160° C. in Section 1, at a temperature of 100° C. in Section 2, at a temperature of 80° C. in Section 3 and at a temperature of 50° C. in Section 4.

To measure physical properties of the self-reinforced composite prepared by the method, tensile strength and tensile modulus of elasticity were measured according to the ISO-527 method. As a result, the obtained self-reinforced composite had a tensile strength of 163 MPa and a tensile modulus of elasticity of 2.29 GPa. Specimen 1-5 of the following Table 1 is a specimen which was taken at five times after preparation of the prepared self-reinforced composite.

TABLE 1

| specimen | tensile modulus of elasticity (GPa) | tensile strength (MPa) |
|---|---|---|
| 1 | 2.18 | 168 |
| 2 | 2.34 | 161 |
| 3 | 2.33 | 157 |
| 4 | 2.33 | 159 |
| 5 | 2.26 | 169 |
| average | 2.29 | 163 |

Example 1: Use of UD-Type Reinforcing Resin Fixed by Stitch Fiber

As a matrix resin, a propylene/ethylene copolymer resin having MI of 25 and Tm of 130° C. was used to prepare a film by an owned process, in the same manner as in Comparative Example 1.

As a stitch resin, a propylene/ethylene copolymer resin having MI of 25 and Tm of 130° C. was used to prepare a fiber having a diameter of 0.5 mm by applying a draw ratio of 5:1 using an owned process (the same resin as in the matrix).

As a reinforcing resin, Y 120 resin from Lotte Chemical Corp., which is a homopolypropylene having MI of 1, Tm of 165° C., and a molecular weight (Mw) of 480,000, was used. The reinforcing resin was prepared as a yarn by applying a draw ratio of 15:1 using an owned process, and then a fiber was prepared. To obtain a reinforcing resin fixed by the stitch resin, the fiber had mechanical properties of a denier of 1880, a tensile modulus of elasticity of 133.2 $g_f$/denier, a tensile strength of 6.8 $g_f$/denier and elongation of 7.44%. The fibers were arranged linearly, and then a thermoplastic fiber having a melting point of 130° C. was used as the prepared stitch resin to fix the reinforcing resins by stitching, thereby preparing a reinforcement fabric. The reinforcement fabric was unidirectional (UD), and thus 0° and 90° were used as a set.

To laminate the reinforcing resin fixed by the stitch fiber and the matrix resin as a three-layered laminate in this order of reinforcing fiber/matrix/reinforcing fiber, they were placed in a roll-type unwinder. The reinforcing resin and the matrix resin were laminated in the order while they were transported from the unwinder, and then transferred to a double belt press laminator. A thickness of a specimen before processing was 0.56 mm, and the double belt laminator was operated at a belt distance (roll gap) of 0.5 mm, a belt speed of 8 mm/sec and a retention time of 150 sec. The double belt press laminator was a double belt press having four separated sections. In this experiment, Sections 1 to 4 were set at different temperatures, and the temperature of Section 1 was the highest. The laminator was set to have a decreasing temperature gradient from the inlet toward the outlet, and the retention times in the individual sections were set to be the same. The laminator was operated at a temperature of 160° C. in Section 1, at a temperature of 100° C. in Section 2, at a temperature of 80° C. in Section 3 and at a temperature of 50° C. in Section 4.

To measure physical properties of the self-reinforced composite prepared by the method, tensile strength and tensile modulus of elasticity were measured according to the ISO-527 method. As a result, the obtained self-reinforced composite had an average tensile strength of 180 MPa and an average tensile modulus of elasticity of 2.55 GPa. Specimen 1-5 of the following Table 2 is a specimen which was taken at five times after preparation of the prepared self-reinforced composite.

TABLE 2

| specimen | tensile modulus of elasticity (GPa) | tensile strength (MPa) |
|---|---|---|
| 1 | 2.48 | 191 |
| 2 | 2.67 | 172 |
| 3 | 2.51 | 173 |
| 4 | 2.49 | 181 |
| 5 | 2.59 | 182 |
| average | 2.55 | 180 |

The results of evaluating properties of the thermoplastic resin composite, which was prepared by using the reinforcing fiber fixed by the stitch fiber, showed that the tensile modulus of elasticity was increased by about 9.5%, compared to a resin composite prepared by using the reinforcing fiber which was not fixed by the stitch fiber. These experimental results suggest that deterioration of the physical properties due to weft/warp waviness during weaving may be prevented by unidirectional lamination of the highly drawn fiber reinforcing material fixed by the stitch fiber. Further, as the stitch fiber having a low melting point was selectively melted without melting the reinforcing fiber by heating, a reduction in degree of crystallization of highly drawn Homo-PP by heating was prevented by a latent heat effect.

Example 2: Use of Reinforcements with Different Draw Ratios

In this Example, a resin having a draw ratio different from that of the reinforcing resin used in Example 1 was used to prepare a thermoplastic resin composite, and physical properties thereof were measured.

In detail, as the reinforcing resin, Y 120 resin from Lotte Chemical Corp., which is a homopolypropylene having MI of 1, Tm of 165° C., and a molecular weight (Mw) of 480,000, was used. The reinforcing resin was prepared as a yarn by applying a draw ratio of 14:1, and a fiber was prepared. The fiber had mechanical properties of a denier of 1850, a tensile modulus of elasticity of 120.2 $g_f$/denier, a tensile strength of 6.4 $g_f$/denier and an elongation of 9.32%. The fibers were arranged linearly, and then a thermoplastic fiber having a melting point of 130° C. was used as the prepared stitch resin to fix the reinforcing resins by stitching, thereby preparing a reinforcement fabric. The reinforcement fabric was unidirectional (UD), and thus 0° and 90° were used as a set.

The matrix resin and the stitch resin were prepared by the method which was substantially the same as in Example 1. In the same manner as in Example 1, the double belt press laminator was used to prepare a thermoplastic resin composite composed of the reinforcing fiber fixed by the stitch fiber, and the matrix resin and the stitch resin.

To measure physical properties of the self-reinforced composite prepared by the method, tensile strength and tensile modulus of elasticity were measured according to the ISO-527 method. As a result, the obtained self-reinforced composite had an average tensile strength of 173 MPa and an average tensile modulus of elasticity of 2.43 GPa. Specimen 1-5 of the following Table 3 is a specimen which was taken at five times after preparation of the prepared self-reinforced composite.

TABLE 3

| specimen | tensile modulus of elasticity (GPa) | tensile strength (MPa) |
|---|---|---|
| 1 | 2.40 | 174 |
| 2 | 2.38 | 178 |
| 3 | 2.48 | 171 |
| 4 | 2.50 | 170 |
| 5 | 2.39 | 176 |
| average | 2.43 | 173 |

Comparative Example 2: Use of Stitch Fibers with Different Melting Points

In this Comparative Example, a resin having a melting point different from that of the stitch fiber used in Example 1 was used to prepare a thermoplastic resin composite, and physical properties thereof were measured.

In detail, as the stitch fiber, a homopropylene resin having MI of 1 and Tm of 165° C. was used to prepare a fiber having a draw ratio of 5:1 and a diameter of 0.5 mm. The prepared stitch fiber was used to fix the same reinforcing fiber as in Example 1. The reinforcing fiber and the matrix resin were prepared by a method which was substantially the same as that of Example 1.

In the same manner as in Example 1, the double belt press laminator was used to prepare a thermoplastic resin composite composed of the reinforcing fiber fixed by the stitch fiber and the matrix resin.

To measure physical properties of the self-reinforced composite prepared by the method, tensile strength and tensile modulus of elasticity were measured according to the ISO-527 method. As a result, the obtained self-reinforced composite had an average tensile strength of 174 MPa and an average tensile modulus of elasticity of 1.87 GPa. Specimen 1-5 of the following Table 4 is a specimen which was taken at five times from the prepared self-reinforced composite.

TABLE 4

| specimen | tensile modulus of elasticity (GPa) | tensile strength (MPa) |
|---|---|---|
| 1 | 1.78 | 170 |
| 2 | 1.87 | 174 |
| 3 | 1.94 | 176 |
| 4 | 1.92 | 179 |
| 5 | 1.86 | 171 |
| average | 1.87 | 174 |

Comparative Example 3

In this Comparative Example, the same stitch fiber and matrix resin film as in Example 1 were used and a reinforcing resin having a different draw ratio was used.

In detail, as the reinforcing resin, Y 120 resin from Lotte Chemical Corp., which is a homopolypropylene having MI of 1, Tm of 165° C., and a molecular weight (Mw) of 480,000, was used. The reinforcing resin was prepared as a yarn by applying a draw ratio of 10:1 using an own process, and a fiber was prepared. The fiber had mechanical properties of a denier of 1800, a tensile modulus of elasticity of 60.8 g/denier, a tensile strength of 5.8 g/denier and an elongation of 16.44%. The fibers were arranged linearly, and then the stitch resin was used to fix the reinforcing resins by stitching, thereby preparing a reinforcement fabric. The reinforcement fabric was unidirectional (UD), and thus 0° and 90° were used as a set.

In the same manner as in Example 1, the double belt press laminator was used to prepare a thermoplastic resin composite composed of the reinforcing fiber fixed by the stitch fiber, and the matrix resin and the stitch resin.

To measure physical properties of the self-reinforced composite prepared by the method, tensile strength and tensile modulus of elasticity were measured according to the ISO-527 method. As a result, the obtained self-reinforced composite had an average tensile strength of 150 MPa and an average tensile modulus of elasticity of 1.17 GPa. Specimen 1-5 of the following Table 5 is a specimen which was taken at five times after preparation of the prepared self-reinforced composite.

TABLE 5

| specimen | tensile modulus of elasticity (GPa) | tensile strength (MPa) |
|---|---|---|
| 1 | 1.12 | 161 |
| 2 | 1.22 | 143 |
| 3 | 1.11 | 142 |
| 4 | 1.29 | 152 |
| 5 | 1.12 | 151 |
| average | 1.17 | 150 |

Although the preferred embodiments of the present disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. A method of preparing a thermoplastic resin composite, comprising steps of:
    laminating a matrix resin layer and a reinforcing resin layer by arranging the matrix resin layer and the reinforcing resin layer at a predetermined crossing angle to prepare a resin laminate,
    fixing one or more selected from the group consisting of the reinforcing resin layer and the resin laminate using a stitch resin, and
    heat-bonding the resin laminate,
    wherein the stitch resin is in the form of a fiber having a diameter of 0.05 mm to 1 mm, the stitch resin having a draw ratio of less than 10:1 and a melting point of 150° C. or lower,
    wherein the reinforcing resin layer comprises a reinforcing resin having a draw ratio of 14:1 to 20:1 and a melting point of 160° C. to 180° C. which is higher than that of the stitch resin,
    wherein the matrix resin layer comprises a matrix resin having a melting point of 100° C. to 150° C.,
    wherein the step of heat-bonding the resin laminate is performed at a temperature higher than the melting point of the stitch resin and lower than the melting point of the reinforcing resin so that the stitch resin and the matrix resin are selectively melted, the reinforcing resin is not melted, and a latent heat due to selective melting of the stitch resin prevents a reduction in degree of crystallization of the reinforcing resin layer, wherein in the step of fixing, the stitch resin passes alternatively over and under the resin laminate to fix the resin laminate, and wherein the thermoplastic resin composite has a tensile modulus of elasticity of 2.4 GPa or greater and a tensile strength of 170 MPa or greater.

2. The method of claim 1, wherein the matrix resin is in the form of a film, the reinforcing resin is in the form of a fiber, tape or fabric, and the stitch resin is in the form of a fiber.

3. The method of claim 1, wherein the reinforcing resin is in the form of a unidirectional fiber, and is arranged at a predetermined crossing angle to prepare the reinforcing resin layer.

4. The method of claim 1, wherein the reinforcing resin is one or more selected from the group consisting of polypropylene, polybutylene, polypentene, poly(vinyl acetate) and polystyrene.

5. The method of claim 1, wherein in the step of heat-bonding the resin laminate, heating is performed at a temperature higher than the melting point of the stitch resin.

6. The method of claim 1, wherein in the step of heat-bonding the resin laminate, heating is performed at a temperature of 100° C. to 150° C.

7. The method of claim 1, wherein in the step of heat-bonding the resin laminate, the stitch resin and the matrix resin are selectively melted by heating at a temperature in the range of 100° C. to 150° C.

8. A thermoplastic resin composite, comprising:
a resin laminate comprising a matrix resin, a reinforcing resin, and a stitch resin,
wherein a melting point of the matrix resin is 100° C. to 150° C.,
wherein the reinforcing resin has a draw ratio of 14:1 to 20:1 and a melting point of 160° C. to 180° C. which is higher than that of the stitch resin,
wherein the stitch resin has a draw ratio of less than 10:1 and a melting point of 150° C. or lower, and is in the form of a fiber having a diameter of 0.05 mm to 1 mm,
wherein the thermoplastic resin composite is heated at a temperature higher than the melting point of the stitch resin and lower than the melting point of the reinforcing resin so that the stitch resin and the matrix resin are selectively melted, the reinforcing resin is not melted, and a latent heat due to selective melting of the stitch resin prevents a reduction in degree of crystallization of the reinforcing rein layer, and
wherein the stitch passes alternately over and under the resin laminate to fix the resin laminate, and
wherein the thermoplastic resin composite has a tensile modulus of elasticity of 2.4 GPa or greater and a tensile strength of 170 MPa or greater.

9. The thermoplastic resin composite of claim 8, wherein the stitch resin and the matrix resin are melted and bonded.

* * * * *